Figure 1:
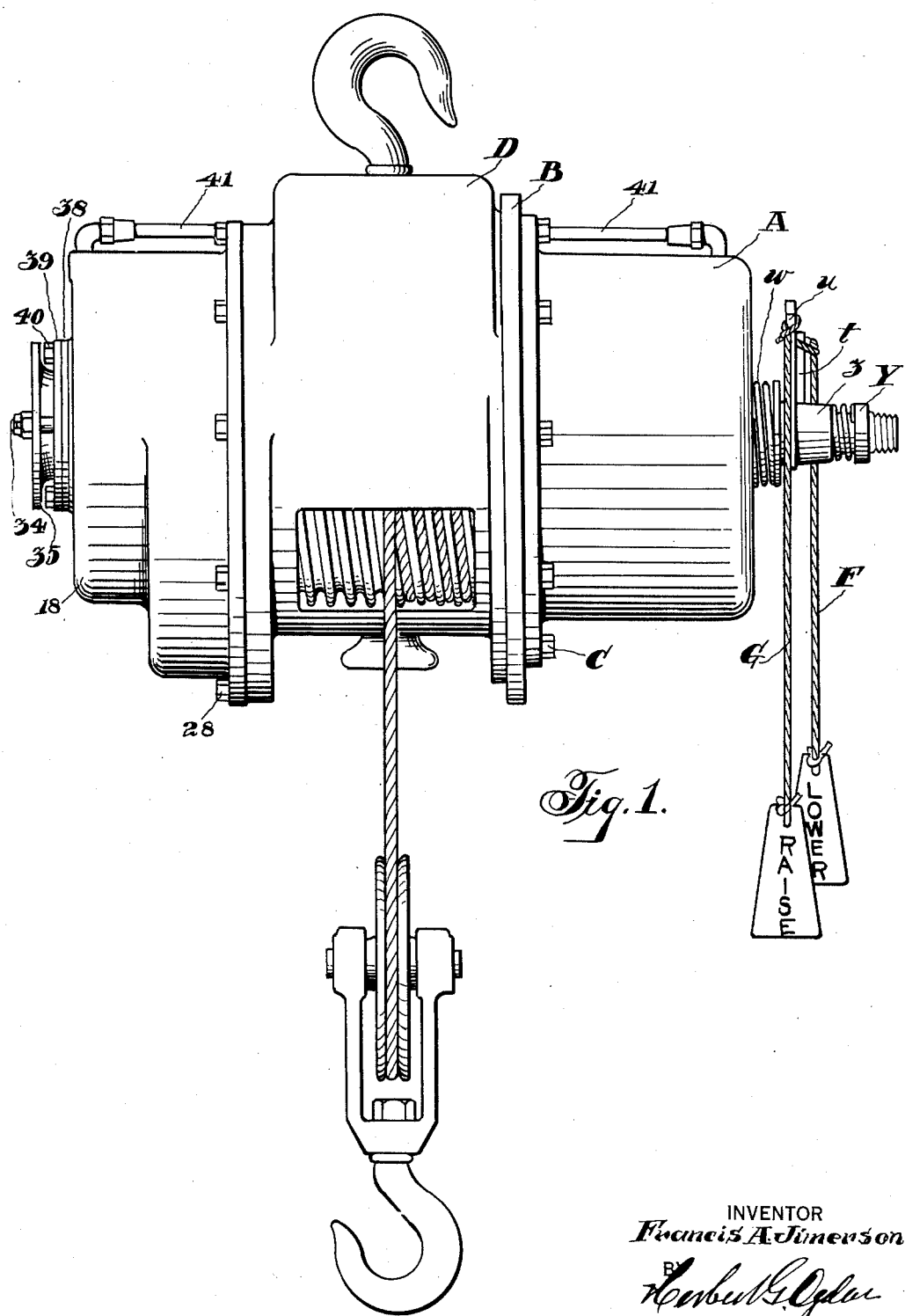

Nov. 17, 1925.

F. A. JIMERSON 1,561,722

MOTOR

Filed April 10, 1924 4 Sheets-Sheet 1

INVENTOR
Francis A. Jimerson
HIS ATTORNEY

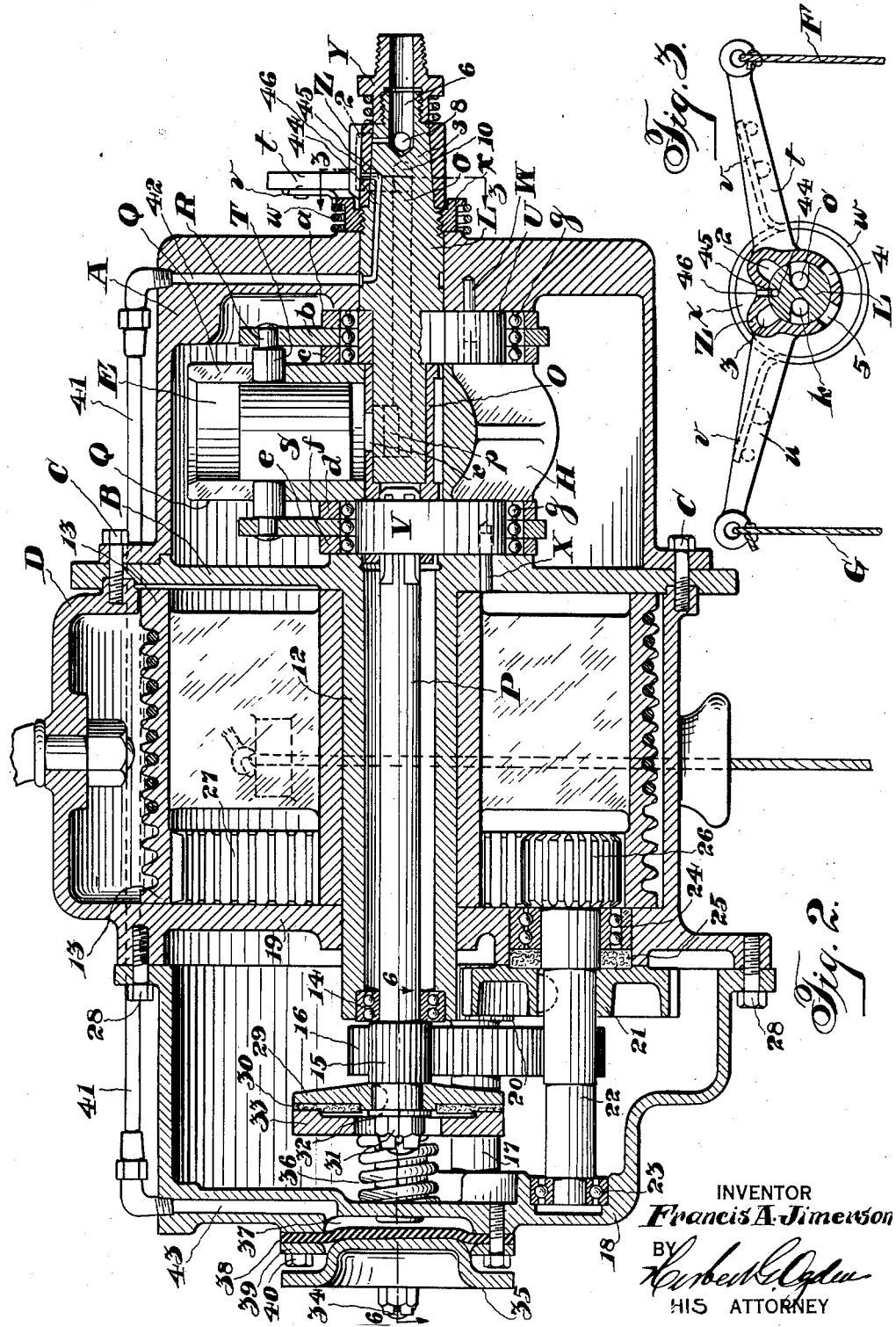

Nov. 17, 1925.    1,561,722
F. A. JIMERSON
MOTOR
Filed April 10, 1924    4 Sheets-Sheet 3
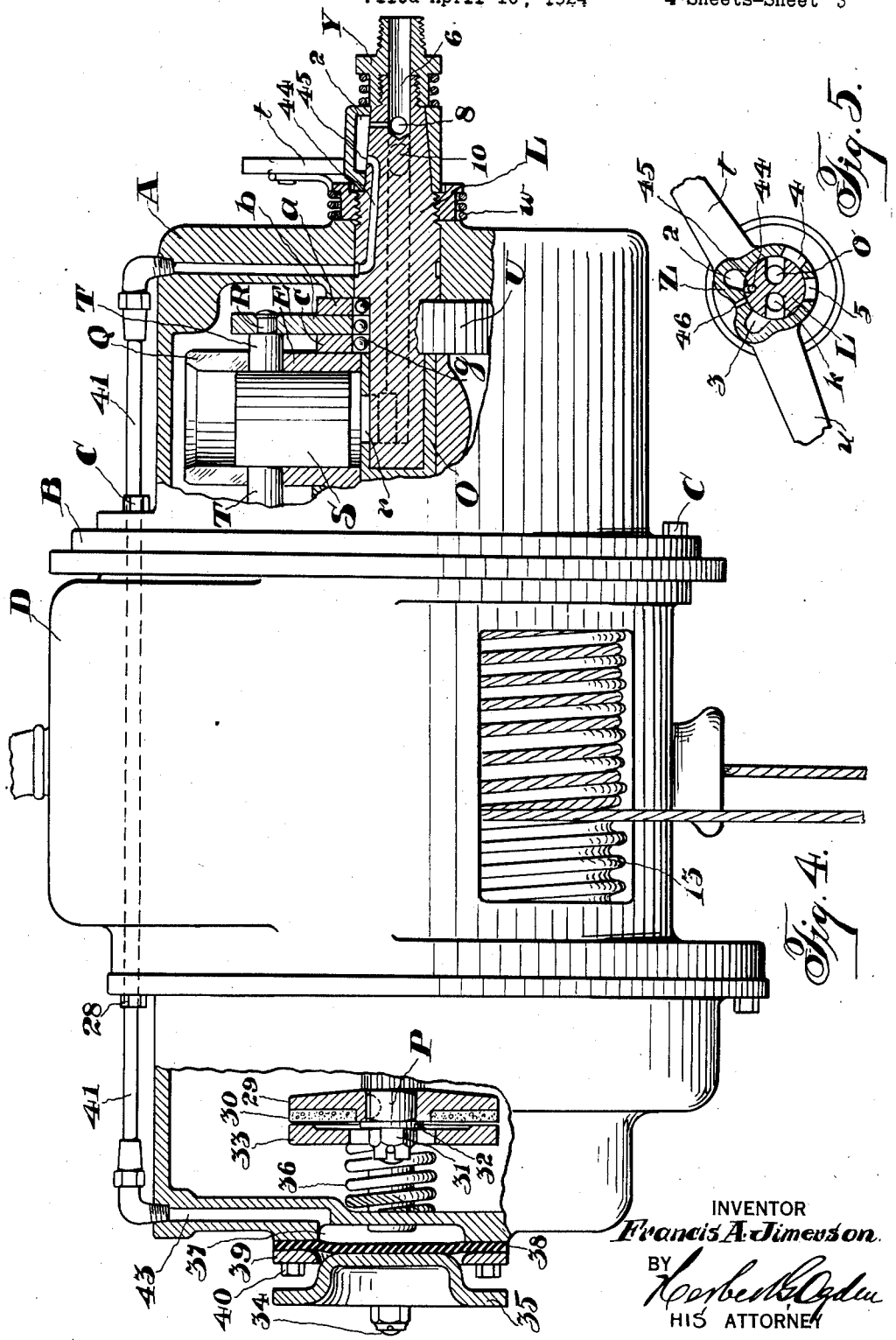

Nov. 17, 1925.
F. A. JIMERSON
MOTOR
Filed April 10, 1924
1,561,722
4 Sheets-Sheet 4
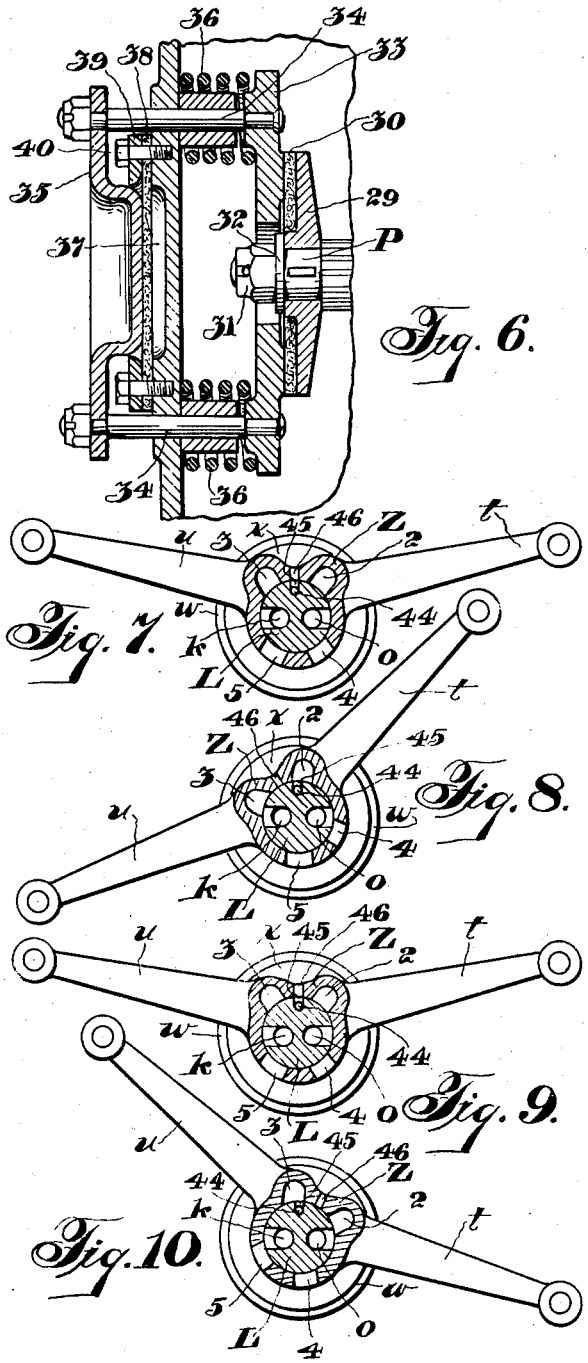

Patented Nov. 17, 1925.

1,561,722

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

MOTOR.

Application filed April 10, 1924. Serial No. 705,416.

*To all whom it may concern:*

Be it known that I, FRANCIS A. JIMERSON, a citizen of the United States, and a resident of Athens, county of Bradford, and State of Pennsylvania, have invented a certain Motor, of which the following is a specification, accompanied by drawings.

This invention relates to motors, but more particularly to a fluid actuated motor for hoists, as for instance a motor of the rotary cylinder type disclosed in United States Patent No. 1,484,960, granted to Caid H. Peck, on February 26, 1924. I am not, however, to be understood as limiting the invention to any particular type of motor, whether operated by steam, compressed air or other motive fluid, and the motor is itself useful for numerous industrial purposes, as for instance hauling as well as hoisting.

In this particular instance, the hoist to which the motor is applied is of the type which may be suspended high above the working floor and may remain in use for an indefinite period, out of the reach of the workmen, so that it may receive little or no cleaning, oiling or other attention, unless reached by a ladder or lowered to the floor.

One of the objects of the present invention is to produce a simple, cheap, comparatively light, strong and powerful hoist, which will withstand constant use without getting out of order under the unfavorable conditions to which such a hoist will ordinarily be subjected.

In hoists of the character referred to, a brake should ordinarily be provided for preventing the load from lowering or gradually falling in case of failure of the motive fluid supply to the motor for any reason, or in case the supply of motive fluid is suddenly shut off. Without such a brake accidents may happen, but such a brake is also advantageous in case the load is desired to be held at some particular point, while the motive fluid is shut off from the motor.

One of the important objects of this invention is to provide an improved brake for the motor which is automatically controlled by fluid actuated means in accordance with the operation of the motor, so that as the motor is started the automatic brake is removed and if the motor is stopped, the brake is automatically applied, and by this means the brake may be said to be controlled in accordance with the supply of motive fluid to the motor.

The motor is preferably reversible, controlled by a reversing valve and another object of the invention is to enable the brake to be automatically operated by fluid actuated means in accordance with the operation of the throttle or reversing valve, whether the motor is rotating in one direction or the other.

Further objects of the invention will hereinafter appear, and the invention is shown in one of its preferred forms in the accompanying drawings, in which Figure 1 is a side elevation of a hoist embodying the invention, Figure 2 is a longitudinal sectional elevation of the hoist with the brake on, Figure 3 is a detail transverse sectional view taken through the throttle on the line 3—3 of Figure 2 looking in the direction of the arrows, Figure 4 is a side elevation partly in longitudinal section taken through the hoist with the brake off, Figure 5 is a detail view similar to Figure 3 partly broken away, and showing the throttle valve in a different position, Figure 6 is a horizontal longitudinal sectional detail view taken through the brake mechanism, on the line 6—6 of Figure 2 looking in the direction of the arrows, and Figures 7, 8, 9 and 10 are detailed transverse sectional views taken through the throttle, similar to Figures 3 and 5 with the throttle in different positions.

The motor for the hoist in this instance is substantially like that shown in the aforesaid United States Patent No. 1,484,960 and reference may be had to that patent for a full disclosure of the motor. Only the essential parts of the motor will herein be referred to in order that the present invention relating to the brake may be understood.

The motor comprises the case A having the cover plate B secured thereto as by means of the cap screws C which also hold the hoist housing D against the cover plate.

The rotary driving member of the motor, consists of a plurality of rigidly connected angularly disposed cylinders, of which only one cylinder E is shown in the drawings for purposes of illustration, there being in fact three cylinders constructed as integral parts of a suitable cylinder casing H which connects and braces the cylinders.

The cylinder casing H is mounted to rotate about the hollow stationary shaft L suitably supported in the case A at one side of the case, and extending into a rotary sleeve or bushing O keyed to the cylinder casing to rotate therewith, and suitably connected to rotate a driven member, as the driven shaft P, extending through the cover plate B.

The walls of each cylinder, indicated generally by the reference character E, are preferably slotted longitudinally at opposite sides at their outer portions for a portion of their length, as indicated at Q through which extend the wrist pins R of the pistons S, and spacing sleeves T are preferably provided over the wrist pins. Stationary eccentrics U and V are mounted at each side of the cylinder casing H in any suitable manner, and in this instance the eccentric U is preferably formed as a part of the stationary shaft L, the shaft and eccentric being held from rotation as by means of the pin W. The eccentric V is conveniently held to the cover plate B as by means of the pin X, and the sleeve O and driven shaft P rotate within the eccentric V which forms a bearing for the sleeve. A plurality of yokes $a$, $b$ and $c$, and $d$, $e$ and $f$, are revolubly mounted side by side on the eccentrics U and V respectively, and ball bearings $g$ consisting of cages and balls, as shown, are preferably interposed between the yokes and the eccentrics. The yokes are assumed to be connected in pairs to the projecting ends of the piston wrist pins R, as shown and described in the aforesaid Patent No. 1,484,960. The intermediate yokes $b$ and $e$ forming one pair, are adapted to be connected to the wrist pin R of the cylinder E shown in the drawing, and the other pairs of yokes are connected to the piston wrist pins of the other cylinders, not shown, it being understood that there are twice as many yokes as cylinders.

Suitable means are provided for supplying and distributing motive fluid to the cylinders, and as shown fluid under pressure, as compressed air, may be supplied and exhausted through the hollow stationary shaft L from the supply connection Y. The shaft L is provided with longitudinal passageways $k$ and $o$ opening outwardly through suitable ports at the center of the machine, one of which ports $p$ is shown in Figure 2, and these ports are controlled by the rotating valve sleeve O, having the ports $r$ so that motive fluid is successively admitted to and exhausted from the cylinder, as the cylinder casing and the valve sleeve O rotate together.

A suitable throttle valve Z is provided for controlling the supply of fluid from the supply connection Y and reversing the motor. This throttle valve Z may be in the form of a sleeve rotatable upon the reduced and preferably tapered end $s$ of the stationary shaft L forming a seat, and operated by means of the arms $t$ and $u$, to which ropes or chains F and G may be connected in the usual manner. The ends $v$ of the retracting spring $w$ coiled about the collar $x$ engage the arms $t$ and $u$ and serve to center the throttle valve so that it may be rocked in either direction for distributing motive fluid to the motor for rotation in one direction or the other.

The throttle valve sleeve Z is formed with the chambers 2 and 3 and the exhaust ports 4 and 5, and the valve seat $s$ is provided with the inlet passage 6 communicating with the radial ports 8 and also with the radial ports 10 only one of each being shown. The ports 10 in turn communicate with the longitudinal passages $k$ and $o$ respectively in the shaft L, as fully described in the said Patent No. 1,484,960. By rocking the throttle valve sleeve, motive fluid is admitted from the supply passage 6 through the chamber 2 or 3 to one of the passages $k$ or $o$, the other of which passage forms an exhaust passage to the atmosphere through the atmospheric port 4 or 5. In Figure 3 for instance, the throttle valve Z is in neutral position and the supply of motive fluid to the motor is cut off, while in Figure 5 the throttle is turned to admit motive fluid through the chamber 3 to the passage $k$ and from thence to the motor at the central rotary valve sleeve O. Fluid is exhausted back through the passage $o$ to the exhaust port 4. When the throttle valve Z is rocked in the opposite direction as indicated in Figure 10, the passage $o$ becomes the supply passage and the passage $k$ becomes the exhaust passage for the motor cylinders, and the operation of the motor is reversed.

The cover plate B of the motor is preferably provided with a hollow cylindrical extension forming a center bearing 12 upon which the rope drum 13 is suitably mounted to freely rotate. The driving shaft P extends through the center bearing and is supported in a ball bearing 14 preferably at the end of the center bearing. The driving shaft P is operatively connected to rotate the drum 13 by suitable gearing, and in this instance the shaft P is provided with a pinion 15 which drives a gear 16 on the intermediate shaft 17, which is supported in suitable bearings in the gear case 18, and in the wall 19 of the hoist housing D. A pinion 20 on the intermediate shaft 17 meshes with a driving gear 21 keyed to the counter shaft 22 which is in this instance supported in suitable ball bearings 23 and 24 in the gear case 18 and wall 19 of the hoist housing D. A packing 25 is preferably provided between the driving gear 21 and the ball bearing 24. A pinion 26 on the counter shaft 22 meshes with the internal gear 27 of the rope drum 13 for driving said drum. The gear case is suitably secured to the hoist housing D as by means of the cap screws 28.

For the purpose of braking the hoist, the driving shaft P is conveniently provided with a brake disc 29 suitably keyed thereto and may have a brake lining 30 of any suitable fibrous material. The brake disc may be held from longitudinal movement on the end of the driving shaft P, as by means of the nut 31 and washer 32. A brake plate 33 is connected by the bolts 34 to the movable brake plunger or yoke plate 35 conveniently arranged outside the gear case 18 so that the bolts 34 pass through the gear case. These bolts, as shown, have reduced ends forming shoulders which act to space the brake plate and yoke plate from each other. Brake springs 36 are interposed between the brake plate 33 and the wall of the gear case 18 normally tending to force the brake plate 33 against the brake lining 30 of the brake disc 29, thus applying the brake to the driving shaft P, when the motor is not running.

Fluid actuated means are provided for removing the brake with fluid pressure supplied to the motor to start the motor and in this instance, a pressure chamber 37 is conveniently formed in the wall of the gear case 18 beneath the brake plunger or yoke plate 35 and a flexible diaphragm 38 is secured over said chamber 37 by means of the diaphragm plate or ring 39 and the bolts 40. The yoke plate 35 as shown is in contact with the diaphragm 38 and the admission of pressure fluid to the chamber 37 will expand the diaphragm and move the brake plate 33 away from the brake lining 30 against the opposing tension of the brake springs 36. As long as pressure fluid is supplied to the chamber 37, the brake for the driving shaft will be removed.

The supply and escape of pressure fluid to and from the diaphragm chamber 37 may conveniently take place through the pipe 41 conveniently connecting the passage 42 in the motor casing, with the passage 43 in the gear case. The stationary shaft L is preferably provided with a passage 44 leading from the passage 42 in the motor case to a port 45 beneath the throttle valve sleeve Z, and the throttle valve sleeve is provided with a vent 46 to atmosphere, which is brought into registry with the port 45 when the throttle valve is in neutral position, as indicated for instance in Figure 3, so that the diaphragm chamber 37 is vented through the passage 43, pipe 41, passages 42 and 44 to atmosphere through the vent 46 and the pressure of the spring 36 applies the brake to the driving shaft. When the throttle valve Z is moved in one direction or the other to supply motive fluid to the motor, the vent 46 is closed and one or the other of the chambers 2 and 3 is brought into communication with the port 45 in the shaft L which permits motive fluid to pass from the inlet passage 6 through the valve to the passage 45 in the stationary shaft L and from thence through the passage 42, pipe 41, and passage 43 to the diaphragm chamber 37 which expands the diaphragm and withdraws the brake plate 33 away from the brake disc 29 and lining 30, as indicated in Figure 4, so that the brake is removed and the motor may operate. In the case of failure of the supply of motive fluid, the brake will be automatically operated and if the throttle valve is turned to neutral position, the diaphragm chamber 37 will be vented to atmosphere and the brake will be applied.

Figure 5 indicates one position of the throttle valve Z in which the motor is running and the brake has been removed, as shown in Figure 4. In Figure 3, the throttle valve is in neutral position and the brake is applied, as shown in Figure 2.

In Figures 7 to 10, the throttle valve is shown diagrammatically, illustrating a cycle of operations. In Figure 7, the parts are in neutral position, while in Figure 8, the throttle valve has been moved to cause the motor to rotate in one direction and motive fluid is supplied to the diaphragm chamber by means of the chamber 2, in the throttle. In Figure 9 the parts have been turned to neutral position, and in Figure 10 the valve has been moved in the opposite direction and motive fluid is supplied to the diaphragm chamber through the chamber 3 in the throttle.

In am not to be understood as limiting the invention to the apparatus shown in the drawings, and to the details of construction indicated, as those skilled in the art will be able to devise equivalent constructions within the scope of this invention, as defined by the claims appended hereto.

I claim:

1. In a motor, the combination of a casing, a driving shaft, a brake disc for the shaft, a brake plate movable to and from the disc, a brake plunger, means connecting the plate and plunger to move together, springs interposed between the brake plate and the casing normally tending to force the plate against the disc, a pressure chamber opposite the plunger, a flexible diaphragm secured over the chamber and cooperating with the plunger and means for controlling a supply of pressure fluid to said chamber to control the operation of the diaphragm and the brake.

2. In a motor, the combination of a casing, a driving shaft, a brake disc for the shaft, a brake plate movable to and from the disc, a brake plunger located outside the casing, bolts passing through the casing connecting the plate and plunger, means for spacing apart the plate and plunger, springs interposed between the plate and casing, a pressure chamber formed in the wall of the casing opposite the plunger, a diaphragm secured over said chamber and in contact with the plunger, and means for controlling a supply of pressure fluid to said chamber to control the operation of the diaphragm and the brake.

3. In a motor, the combination of a casing, a driving shaft, a brake disc rotating with the driving shaft, a brake lining on the disc, a brake plate cooperating with the brake disc, a brake plunger located outside the casing, bolts passing through the casing connecting the brake plate and plunger, shoulders on the bolts for spacing apart the plate and plunger, springs interposed between the brake plate and the casing normally tending to force the brake plate against the brake disc, a pressure chamber formed in the wall of the casing opposite the plunger, a flexible diaphragm over said pressure chamber and in contact with the plunger, a ring securing said diaphragm to the casing, and means for controlling a supply of pressure fluid to said chamber to control the operation of the diaphragm and the brake.

In testimony whereof I have signed this specification.

FRANCIS A. JIMERSON.